United States Patent [19]

Carey et al.

[11] Patent Number: 5,108,335
[45] Date of Patent: Apr. 28, 1992

[54] SOUND PROCESSING SYSTEM AND VEHICLE HARNESS

[75] Inventors: Carl E. Carey, Farmington Hills; Randal D. Wurmlinger, Davisburg, both of Mich.

[73] Assignee: Amerimax Incorporated, Farmington Hills, Mich.

[21] Appl. No.: 654,951

[22] Filed: Feb. 13, 1991

Related U.S. Application Data

[62] Division of Ser. No. 244,938, Sep. 15, 1988, Pat. No. 5,034,996.

[51] Int. Cl.⁵ .............................................. H04B 1/06
[52] U.S. Cl. .................................... 455/345; 455/350; 381/86; 358/189
[58] Field of Search ................. 455/345, 347, 344, 42, 455/350; 358/254, 93; 381/56, 81, 86

[56] References Cited

U.S. PATENT DOCUMENTS 3,382,439  5/1968  Frihart ................................. 455/344
4,602,358  7/1986  Sato ..................................... 455/345
5,034,996  7/1991  Carey et al. .......................... 381/86

Primary Examiner—Curtis Kuntz
Attorney, Agent, or Firm—Reising, Ethington, Barnard, Perry & Milton

[57] ABSTRACT

The invention is a harness control assembly (10) for a van or the like. The assembly (10) includes a switch (46) on the dashhboard for manually actuating between one of radio (18) or television (20), rear speaker off or all speakers off for selecting the output to the rear speakers (30) and controlling power to front speaker system (28). A processor (50) receives the selection signal from the switch (46) via a transmitter (48) and the inputs from the radio (18) and television (20) for interconnecting the rear speaker (30) to the selected signal. The assembly (10) includes a headphone transmitter (64) for transmitting the radio and television signals from the processor. Individual headphone selectors (102) receive the television and radio signal for each passenger from the transmitter (64) for selecting one of television (20), radio (18), or auxiliary (80) to be audibly output through a headset.

6 Claims, 3 Drawing Sheets 5,108,335

SOUND PROCESSING SYSTEM AND VEHICLE HARNESS

This is a division of application Ser. No. 244,938, filed on Sep. 15, 1988, now U.S. Pat. No. 5,034,996.

TECHNICAL FIELD

This invention relates to a harness for a vehicle to control the rear and forward speakers in conjunction with a radio, television, and headphone of a vehicle.

BACKGROUND OF THE INVENTION

Harnesses, particularly for vans, have included wiring between a television output, the radio output, and front and rear speakers. Headphone jacks are provided generally above each rear passenger seating position of the vehicle with a switch to switch between off, television, and radio. Each headphone is required to receive the same signal as all others and therefore the listeners are required to listen to same acoustic output as each other headphone unit. The only acoustic output of the television is via the headphones. Additionally, a switch is provided on the front dashboard having selections of off and radio which control the output of the rear speakers.

The problem with this type of system is that each headphone is required to receive the same signal, and therefore the individual user is not able to select his own acoustic output. Additionally, when auxiliary input is used to the headphones, each headphone was required to receive this same audio signal. Furthermore, the television output signal is sent only to the headphones and not output to the rear speakers.

SUMMARY OF THE INVENTION AND ADVANTAGES

The invention is a control assembly for a vehicle. The assembly comprises a processor means for receiving a radio signal and television signal and a control signal indicative of either off and radio and television selection and for producing an audio output signal to a rear speaker means, the audio signal comprising one of radio signal and television signal when one of radio selection and television selection is indicated by the control signal. Also included is switching means for selectively switching between either of off and radio and television to produce the control signal indicating one of off and radio and television selection for controlling the acoustic output of the rear speaker system, and selection transmission means for receiving the control signal from the switching means and transmitting the control signal to the processor means.

The invention also is a control assembly comprising rear radio transmission means for communicating radio signal between a forward connector means adapted to be connected to the rear radio output, television signal transmission means having television output connector for receiving a television output signal and transmitting same to a television input connector, processor means for receiving the radio signal from said rear radio transmission means and the television signal from said television signal transmission means and for supplying the radio and television signals to an output, headphone transmission means connected to said output of said processor means for transmitting the radio signal and television signal and having a plurality of output connectors, and a plurality of remote selection means connected to said output connectors for selectively switching between off and television and radio and an auxiliary input selections to control the output to the respective individual headphone independent of one another.

The advantages of the invention are that the television output may be selected and connected to the rear speaker. Additionally, each headphone input is individually controlled and connected to one of off, the radio, and television, and axillary.

DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
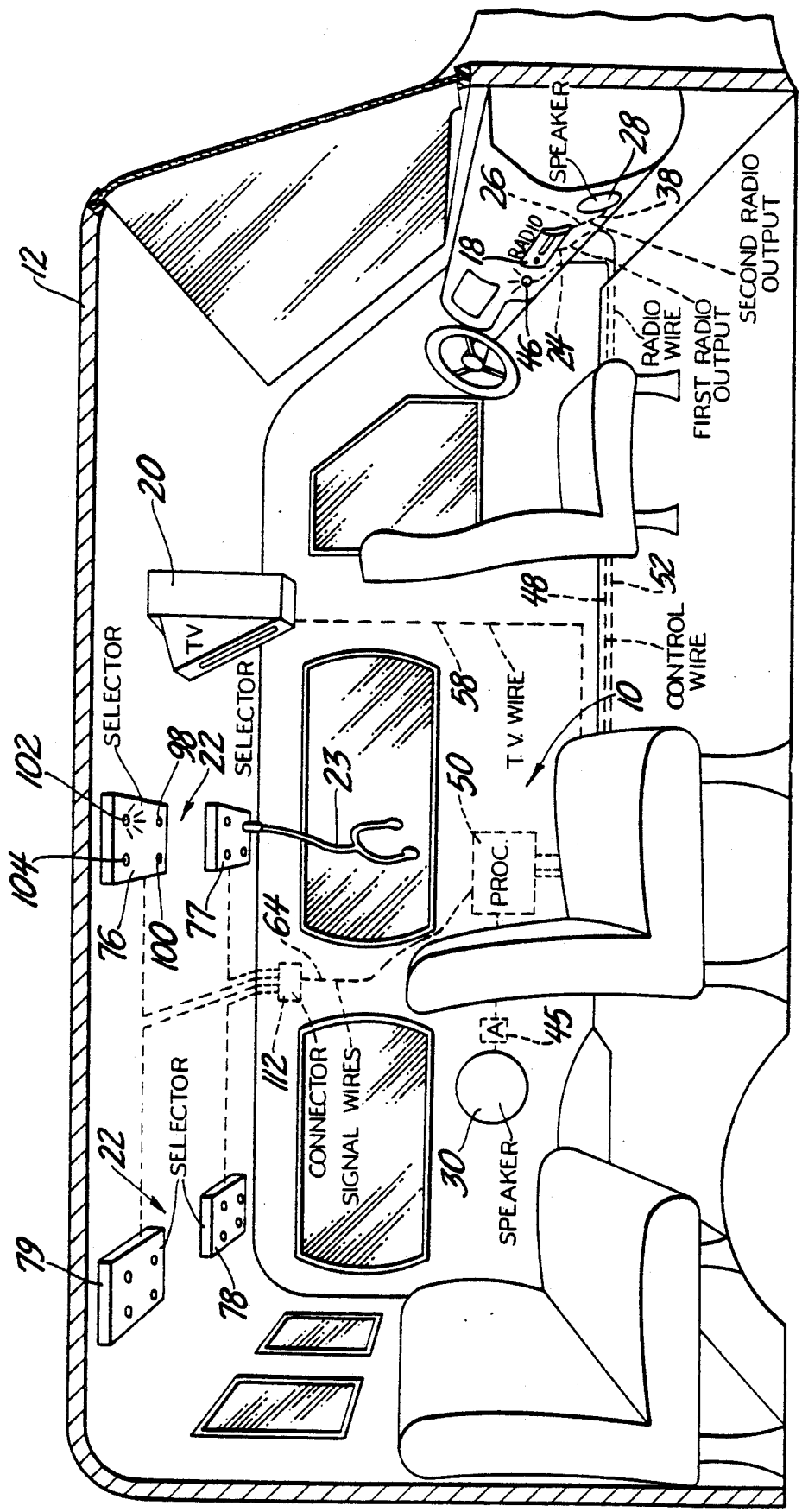
FIG. 1 is a partially broken away perspective view of a vehicle embodying the subject invention.
Figure 2:
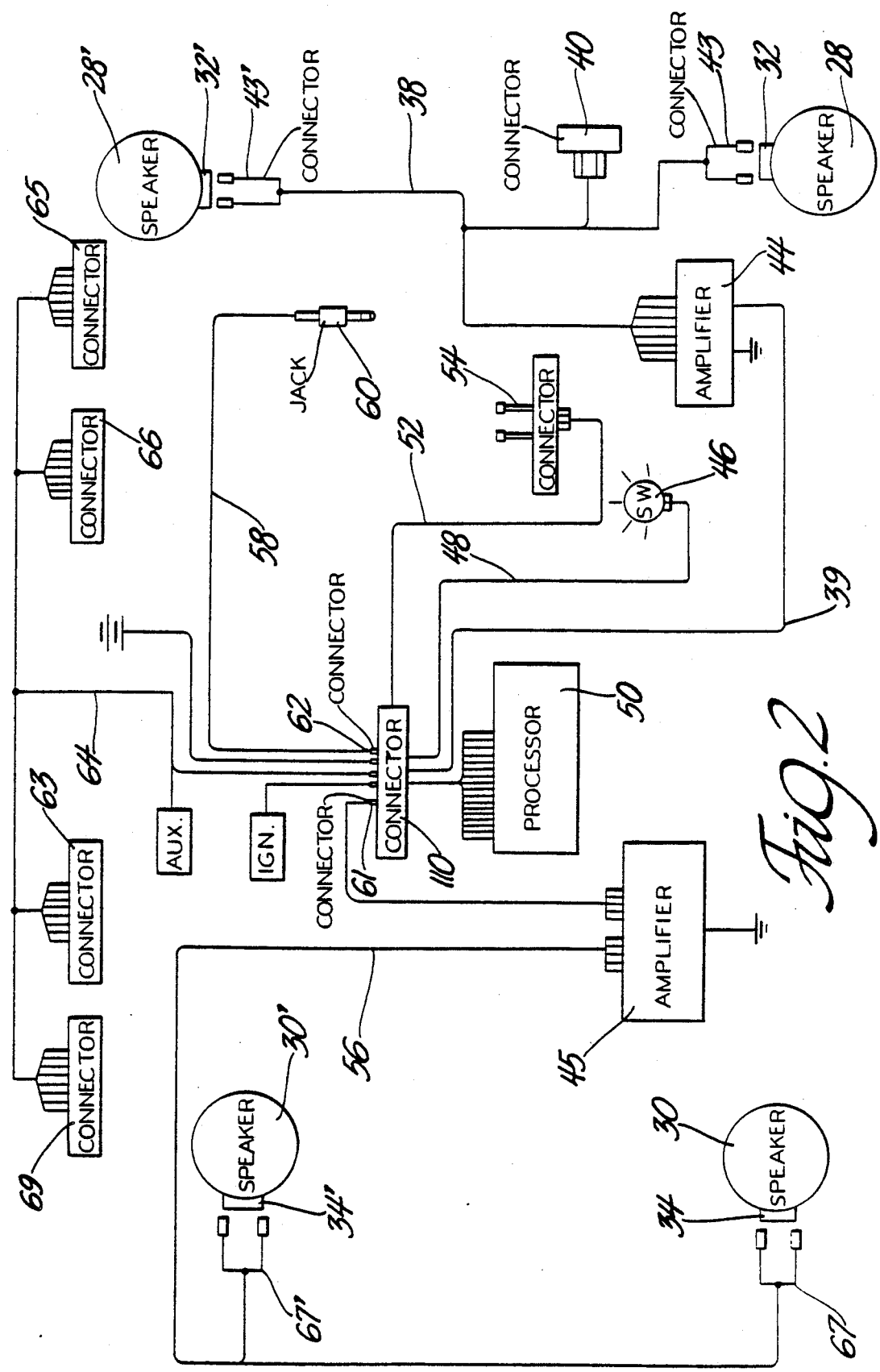
FIG. 2 is a schematic diagram of the subject invention.
Figure 3:
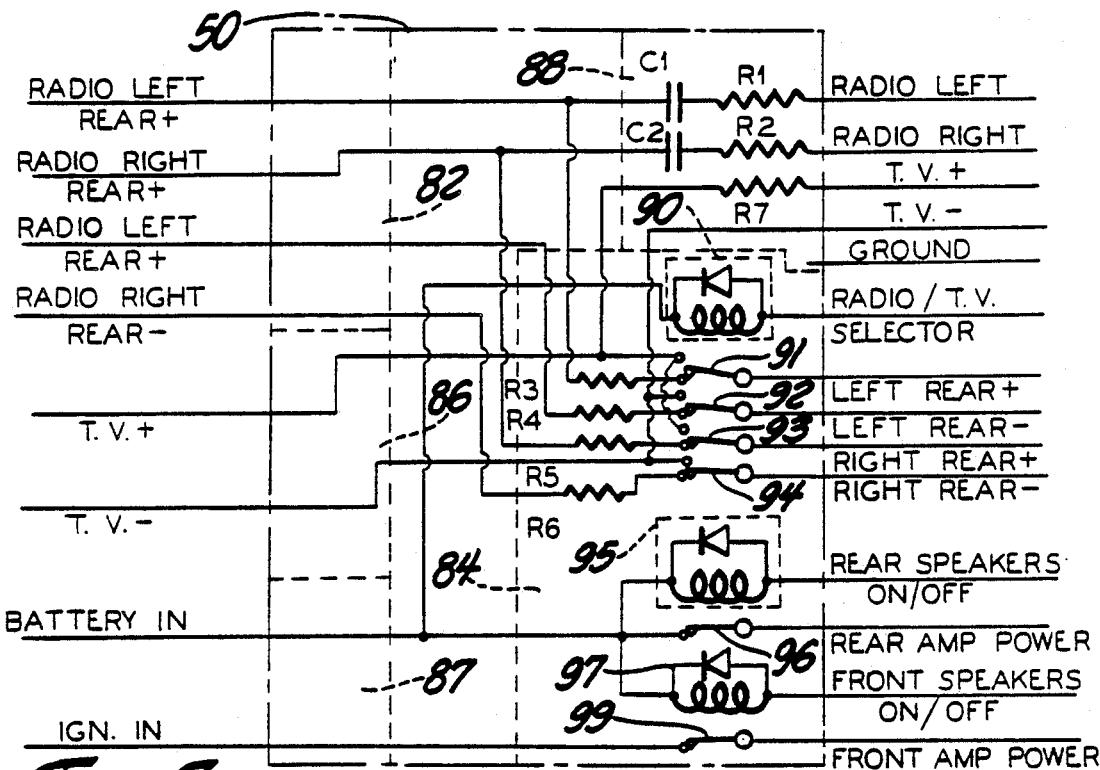
FIG. 3 is a schematic diagram of the processor means of the subject invention.
Figure 4:
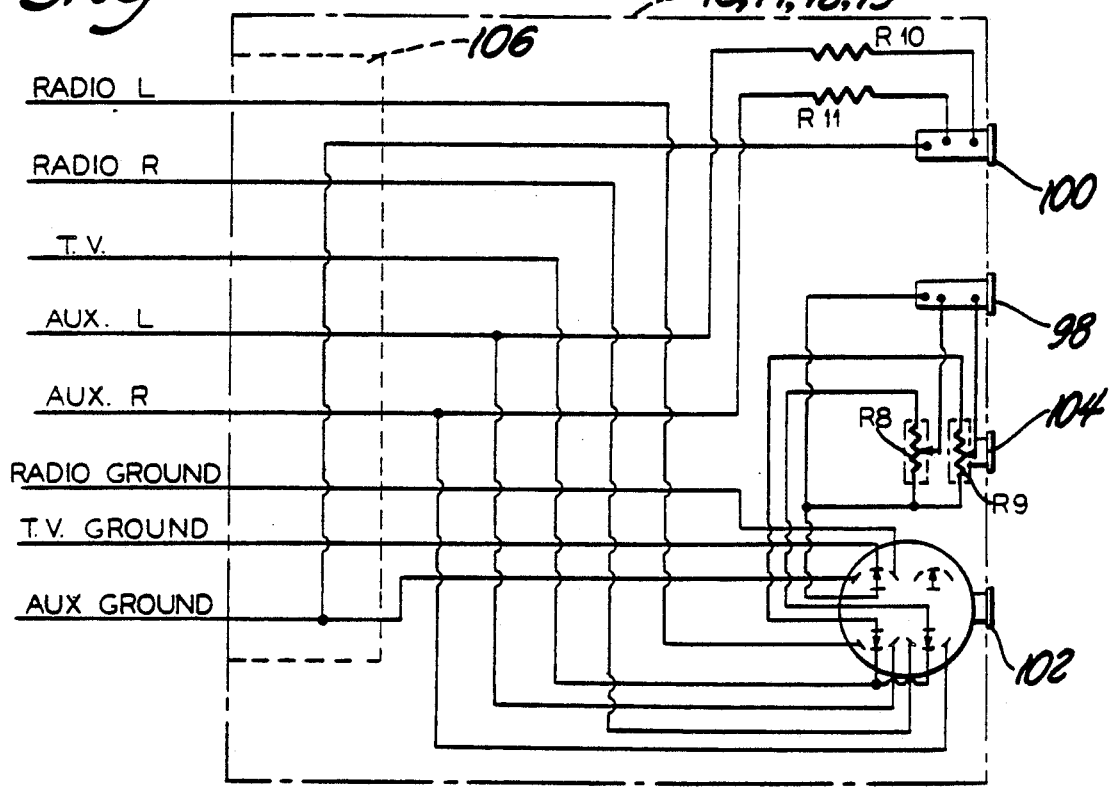
FIG. 4 is a schematic diagram of the remote selection means.

A control assembly 10 for a vehicle 12 is generally shown in FIGS. 1 and 2 at 10. The vehicle 12 generally includes a forward compartment 14 located at the dashboard and a rearward compartment 16 located near the rear of the vehicle 12 where passengers are located. The vehicle 12 generally has a radio 18, television 20 and headphone 22 capabilities. The vehicle may be a van, as indicated in FIG. 1, or a motor home, boat, etc.

The vehicle 12 includes the radio 18 located in the forward compartment 14 having rear 24 and forward radio outputs 26. A rear transducer or speaker means 30 is connected to the rear radio outputs 24 and a front transducer or speaker means 28 is connected to the forward radio outputs 26. The front speaker means 28 includes a front speaker input 32,32' for receiving an electrical signal wherein the front speaker means 28 converts the electrical signal to an audio signal, and the rear speaker means 30 includes rear speaker input 34,34' for receiving an electrical signal wherein the rear speaker means 30 converts the electrical signal to an audio signal. More specifically, the front speaker means 28 includes a right front speaker 29 and a front left speaker 29' each receiving respective signals from the front radio output 26, likewise, the rear speaker means 30 includes a right rear speaker 31 and left rear speaker 31' each receiving respective signals from the rear radio output 24.

The rear speaker means 30 includes rear amplifier means 45 responsive to the audio signal for amplifying the audio signal and producing an amplified signal to the rear speaker input. The rear amplifier means 45 is normally turned off, but automatically turns on in response to sensing the presence of an audio signal on the rear speaker transmission means 56 and will automatically turn off in the absence of the audio signal.

The vehicle 12 also includes a television 20 producing a television signal representative of the audio output of the television 20. There are also headphones 22 provided in the rear compartments for electrical connection with a headset 23.

The assembly 10 includes switching means 46 for controlling the amplifier means 45 and rear speaker inputs 34,34' and power to front speakers 28. The switching means 46 selectively switches between either of rear speaker off and all speakers off and radio 18 and television 20 to produce a control signal indicative of one of rear speaker off and all speakers off and radio 18 and television 20 selection for controlling the acoustic output of the rear speaker means 30,30' and power to the front speaker means 28. The switching means 46 may be a rotary switch located on the front dashboard of the forward compartment 14 having visual indications for switching between rear speaker off, all speakers off, radio, and television as indicated in FIG. 2. Selection transmission means 48 receives the control signal from the switching means 46 and transmits the same to the rearward compartment 16, as subsequently described. The selection transmission means 48 generally includes four wires carrying the control signal indicating radio 18 or television 20 selection, power signal indicating whether the rear speaker means 30 are on or off, power signal indicating whether front speaker means 28 are on or off, and ground. The all speakers selection will control two wires for the front and rear speakers.

The assembly 10 includes processor means 50 for receiving a radio output signal and television signal and the control signals indicative of either rear speaker off, all speakers off, or radio or television selection and for producing an audio signal to the rear speaker means 30. The processor means 50 also selectively supplies a power signal to the rear amplifier means 45 in response to the control signals and to the front amplifier means 44, as subsequently explained. The audio signal comprises one of radio output signal or television signal when one of radio 18 or television 20 selection is indicated by the control signal. The processor means 50 is connected to the selection transmission means 48 for controlling and interconnecting the rear speaker input 34 to one of off and first radio output 24 and television output corresponding to selection by the switching means 46 and for controlling power to the front speaker means 28.

The assembly 10 includes rear radio transmission means 52 for communicating electrical signals between a forward connector means 54 adapted to be connected to the first radio output 24 and connectors adapted to be connected to the processor means 50. The rear radio transmission means 52 comprises four wires for the positive left rear speaker input, negative left rear speaker input, position right rear speaker input, and negative right rear speaker input.

The assembly 10 includes first speaker transmission means 56 having a control output 66 to be connected to the processor means 50 and amplifier connectors to be connected to the amplifier means 45, and second speaker transmission means 57 having an amplifier output connected to the amplifier means 45 and speaker connectors 67,67' adapted to be connected to the rear speaker means 30. The speaker transmission means 56 comprises five wires for transmitting same information as the rear radio transmission being the positive left rear speaker input, negative left rear speaker input, positive right rear speaker input, negative right rear speaker input, and power. The power wire is only sent to the amplifier means 45.

Television transmission means 58 has television output connector 60 for receiving the television input and television connector 62 adapted to be connected to the processor means 50 for supplying the television output signal. The television transmission means 58 comprises two wires for positive television signal and negative television signal.

The assembly 10 includes headphone transmission means 64 connected to the processor means 50 for transmitting the radio signal and television signal and has a plurality of output connectors 63,65,66,69. The headphone transmission means 64 comprises four wires for the left radio input, right radio input, positive television input and negative television input. A fifth and sixth wire are included in the headphone transmission means 64 for transmission of an auxiliary input. The auxiliary input may be an auxiliary radio for the rearward compartment 16, or may have an input at the headphones 22 as subsequently described. A plurality of remote selection means 76, 77, 78, 79 are connected to the connectors 63, 65, 66, 67, 69 for switching between television 20 and radio 18 and auxiliary input 80 and off selections to control the output to the individual headphones independent of the switching means 46 and the other remote selection means 76, 77, 78, 79.

Therefore, the processor means 50 receives the television signal, the radio signal, power and ignition signal and the control signal from the switching means 46 in the forward compartment 14. The processor means 50 supplies the radio signal and the television signal to the headphone transmission means 64 so that each passenger is capable of selecting individually the output to its respective headphone 22. The processor means 50 is responsive to the switching means 46 for controlling the rear speaker input 34 to one of off, radio 18 or television 20. The processor means 50 will operate to control the selected signal of the television 20 or the radio 18 and supply same to the rear audio transducer or speaker means 30 via the speaker transmission means 56 based on the switching means 46. The individual remote selection means 76, 77, 78, 79 are independently operated by each passenger user. The processor means 50 also operates and control the front speakers 28 to on and off based on the switching means 46.

The processor means 50 more specifically includes radio receiver means 82 for receiving the rear radio output 24 for transmitting the radio signal via the speaker transmission means 56 to the rear speaker input 34 and to the headphone transmission means 64 to the headphone connectors 63, 65 66, 69. Further included is television receiver means 86 for receiving television input and transmitting same to the speaker transmission means 56 for the rear speaker input 34 and to the headphone transmission means 64 for the headphone connectors 63, 65, 66, 69. Power receiver means 87 receives the power or battery line and the ignition line which supplies power when the ignition is on and transmits the same to a speaker switching means 84. Speaker switching means 84 are included for receiving the radio signal and the television signal and the control signal and for controlling the output of the speaker transmission means 56 to the rear speaker input 34. Signal transmitter means 88 is included for connecting the radio and television signals to the headphone transmission means 64. The radio receiver means 82 supplies the radio signals and is connected to the signal transmitter means 88 via capacitors C1, C2 18 ohm resistors R1, R2, and to the speaker switching means 84 via 18 ohm resistors R3, R4, R5, R6. Likewise, the television receiver means 86 supplies the television audio signal and is connected to the signal transmitter means 88 via a 18 ohm resistor R7 on its positive lead and directly to the speaker switching means 84. The radio and television outputs at the signal transmitter means 88 to the headphones 22 are protected from short circuit in the processor means 50. The speaker switching means 84 includes a relay 90 receiving the radio/television wire from the switching means 46 to control a plurality of electronic switches 91-94 for interconnecting one of the radio output signals or television output signals to the rear speaker transmission means 56. The switches 91-94 are simultaneously switched to interconnect the radio signal or television signal to the rear speaker transmission means to be acoustically output by the rear speaker 31,31'. A second relay 95 is connected to the rear speaker ON/OFF wire of the selection transmission means 48 to control a power switch 96 to supply power to the rear speaker means 30 in response to the switching means 46. A third relay 97 is connected to the all speakers ON/OFF wire of the selection transmission means 48 to control a power switch 99 to supply power to the front speakers 28 in response to the switching means 46 and when the ignition of the vehicle is on.

Each remote selection means 76, 77, 78, 79 includes a headphone jack 98 for connecting to the headset 23 as standard in the art and indicated in FIG. 1. Also included is auxiliary input means 100 for receiving an auxiliary jack input. The auxiliary input means 100 is a standard jack as generally known in the art which may include a connection to an auxiliary radio, tape player or the like. Also included is headphone selector 102 for selecting one of radio and television and auxiliary selections to be acoustically output by the headphones 22. The headphone selector 102 may be a rotary switch having markings indicating radio 18, television 20, and auxiliary. The remote selection means 76, 77, 78, 79 includes volume switch 104 for adjusting the magnitude of the output to the headphones for volume control and off.

More specifically, the remote selection means 76, 77, 78, 79 includes selection input means 106 for receiving the inputs from the headphone transmission means 64 comprising left radio input, right radio input, television input, television ground, radio ground, left auxiliary line, right auxiliary line, and auxiliary line ground. The auxiliary input means or jack 100 is connected to the auxiliary line at the selection input means 106. The auxiliary lines of each remote selection means 76, 77, 78, 79 are connected such that one auxiliary input jack 100 used in one remote selection means 76, 77, 78, 79 or auxiliary input leads will supply the signal to all other remote selection means 76, 77, 78, 79 for optional selection All the inputs of the selection input means 106 are connected to the headphone selector 102 wherein the headphone selector 102 is manually actuated to interconnect one of the radio, auxiliary and television inputs to the headphone jacks 98. The volume switch 104 is connected between the headphone jack 98 and headphone selector 102 for adjusting the volume via two variable resistors R8, R9.

In the preferred embodiment, the assembly 10 includes control connector means 110 for interconnecting the processor means 50 to the radio transmission means and the headphone transmission means 64 on the television transmission means 58.

In an alternative embodiment, the headphone transmission means 64 includes a sidewall connector 112 placed in the rear sidewall of the rearward compartment 16 of the vehicle 12 as indicated in FIG. 1 for separating a ceiling portion of the transmission means 64 and a sidewall portion of the transmission means 64 for ease in assembly of the vehicle 12 and the harness assembly 10.

The assembly 10 includes forward radio transmission means 38 for communicating electrical signals between a right and left front radio connector 40 adapted to be connected to the right and left front radio output 24 and right and left front speaker connector 42 adapted to be connected to the front right and left speaker inputs 32. The front speaker input 32 is controlled by the radio 18 being turned on and off and by the processor means 50. Front control transmission means 39 communicate the power signal between the switch 99 of the processor means 50 and front amplifier means 44. The front speaker means 28 includes front amplifier means 44 for amplifying the signal and producing an amplified signal to the front signal input. The amplifier means 44 is turned on in response to the ignition on and any selection by the switching means 46 other than the all speakers off selection, and the radio 18 needs to be on. Front control transmission means 39 communicate the power signal between the switch 99 of the processor means 50 and front amplifier means 44 for turning the amplifier 44 on and off depending on the switching means 46. The forward radio communication means 38 includes four wires for transmitting the right speaker positive and negative radio signals and the left speaker positive and negative radio signals. The front control transmission means 39 include one wire for transmitting power.

Each of the described transmission means 38, 48, 52, 56, 58, and 64 are housed in an insulated housing such as a plastic harness as commonly known in the art.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A controller assembly for a vehicle (12), said assembly (10) comprising:
   audio transmission means for supplying a radio signal and a television signal;
   a plurality of remote selection means (76,77,78,79) each having an auxiliary input for receiving an auxiliary signal and a headphone output for supplying an audio signal to a headphone, each of said remote selection means (76,77,78,79) connected to said audio transmission means for receiving said television signal and said radio signal and for independently selectively switching between off and television and radio and auxiliary selections to independently produce said audio signal comprising either off or radio or television or auxiliary signals only to the respective headphone output dependent upon the selection and irrespective and independent of the headphone output of the remaining of said plurality of remote selection means (77,77,78,79).

2. An assembly as set forth in claim 1 further characterized by including headphone transmission means (64)

for transmitting the radio signal and television signal to said plurality of remote selection means (76,77,78,79) and for transmitting the auxiliary signal from one of said plurality of remote selection means (76,77,78,79) to each of the other of said plurality of remote selection means.

3. An assembly as set forth in claim 1 further characterized by including processor means (50) for receiving the radio signal and the television signal and for supplying the radio and television signals to an output and for producing an output signal comprising one of the radio signal and the television signal.

4. An assembly as set forth in claim 3 further characterized by including speaker transmission means (56) having a control input connector connected to said processor means (80) for transmitting said output signal to rear speaker means (30).

5. An assembly as set forth in claim 4 further characterized by said audio transmission means including rear radio transmission means (52) for communicating a radio signal between a forward connector means (54) adapted to be connected to a first radio output.

6. An assembly as set forth in claim 5 further characterized by said audio transmission means including television transmission means (58) having a television output connector (66) for receiving a television signal and transmitting same to a television input connector (62).

* * * * *